United States Patent
Vyas et al.

(10) Patent No.: US 10,198,344 B2
(45) Date of Patent: Feb. 5, 2019

(54) BUILD FAILURE MANAGEMENT IN CONTINUOUS INTEGRATION ENVIRONMENTS FOR DISTRIBUTED SYSTEMS

(71) Applicant: Red Hat, Inc., Raleigh, NC (US)

(72) Inventors: Jay Vyas, Concord, MA (US); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/243,649

(22) Filed: Aug. 22, 2016

(65) Prior Publication Data

US 2018/0052762 A1    Feb. 22, 2018

(51) Int. Cl.
*G06F 9/44* (2018.01)
*G06F 11/36* (2006.01)

(52) U.S. Cl.
CPC ................ *G06F 11/3668* (2013.01)

(58) Field of Classification Search
CPC .................................................. G06F 11/3668
USPC ........................................................ 717/124
See application file for complete search history.

(56) References Cited

U.S. PATENT DOCUMENTS

| | | | |
|---|---|---|---|
| 5,634,098 A * | 5/1997 | Janniro | G06F 11/3688 707/999.104 |
| 7,940,790 B2 * | 5/2011 | Becker | H04W 74/02 370/203 |
| 8,533,676 B2 | 9/2013 | Watters et al. | |
| 9,009,668 B2 | 4/2015 | Pasternak | |
| 2006/0136904 A1 * | 6/2006 | Weidman | G06F 8/71 717/172 |
| 2007/0174023 A1 | 7/2007 | Bassin et al. | |
| 2016/0077820 A1 * | 3/2016 | Bergen | G06F 8/61 717/103 |
| 2017/0060546 A1 * | 3/2017 | Prasad | G06F 8/41 |

* cited by examiner

*Primary Examiner* — Wei Y Zhen
*Assistant Examiner* — Lanny N Ung
(74) *Attorney, Agent, or Firm* — Lowenstein Sandler LLP

(57) ABSTRACT

A processing device, responsive to requests for builds for an application, forces an error to occur during an execution of each request. The execution of each request represents an execution of a set of operations for providing a respective build. The processing device determines that each execution has a false failure caused by a forced error, classifies each execution of the set of operations as having the false failure, determines that an execution of a new set of operations for providing a new build has a failure, determines that one or more features pertaining to the execution of the new set of operations correspond to one or more features pertaining to an execution of one of the sets of operations classified as having the false failure, and re-executes the new set of operations in a modified computing environment to increase a likelihood of successfully providing the new build.

20 Claims, 5 Drawing Sheets

BUILD FAILURE MANAGEMENT IN CONTINUOUS INTEGRATION ENVIRONMENTS FOR DISTRIBUTED SYSTEMS

TECHNICAL FIELD

The present disclosure relates to build management, and more particularly, to build failure management in continuous integration environments for distributed systems.

BACKGROUND

A distributed system, such as a cloud computing system or a grid computing system, can deliver computing resources and provide applications through a large network of computers. In computer program development, continuous integration is the practice of merging developer working copies of computer program code for an application into a shared mainline code base, generally, several times a day. Typically, with continuous integration, each computer program developer team member submits source code for the application being developed on a daily (or more frequent) basis, and an attempt to produce a build is made with each significant source code change. Isolated code changes can be immediately tested when the code is added to the larger mainline code base. A build is executable code, which has been successfully created and tested, for an application. The set of operations for providing a build includes compiling source code files for an application and performing tests on the compiled source code. Some tests are performed on a distributed system. Distributed systems typically use commodity computing hardware (e.g., servers) that is relatively inexpensive, widely available, and more or less interchangeable with other hardware of its type, and typically results in a percentage of the attempts to produce a build being "build flakes."

A build flake is a failed build attempt that is a false failure. A build flake occurs when compiling, unit testing, and/or integration testing of a build is not successful due to an environment issue, rather than with the programming of the code itself. The build failure is considered a false failure because the failure is attributed to an infrastructure issue, and no error or issue is related to the code itself. For example, a computer program developer may successfully compile and/or test computer program code on a local computing machine as an indication that there are no programming issues with the code itself. When the computer program developer submits the code to the build server, the build server may attempt to compile the code, but there may be disk, central processing unit (CPU), and/or memory issues that may cause the compiling process to fail, resulting in a build flake. Computer program developers may be unaware of the underlying infrastructure issue that cause the build attempt to fail and may unnecessarily debug source code, which can lead to delays in the computer program development process. Generally, a significant amount of time and resources may be used to manually determine whether a build failure is a false failure.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
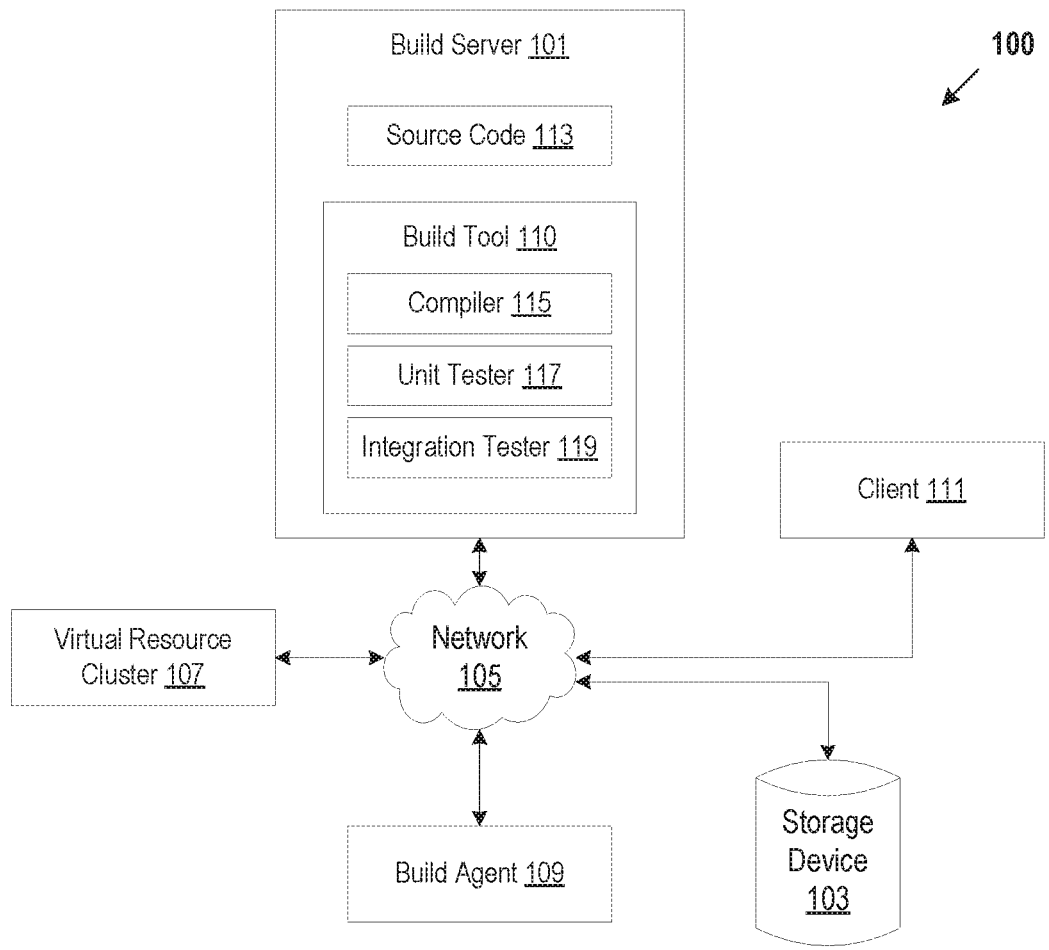
FIG. 1 is an example system architecture in which implementations of the present disclosure can be implemented.

Aspects and implementations of the present disclosure describe managing build failures in continuous integration environments for distributed systems. A distributed system (e.g., cloud computing system, grid computing system) can deliver computing resources through a network of computers. Distributed systems generally run applications across multiple computing machines. In computer program development, continuous integration involves the merging of developer working copies of code for an application into a shared mainline code base. In a continuous integration environment, isolated changes are immediately tested and reported on when the source code is added to the larger mainline code base. Continuous integration provides rapid feedback, such that if a defect is introduced into the code base, the defect can be identified and corrected as soon as possible. Typically, with continuous integration, each computer program developer team member submits source code for the application being developed on a daily (or more frequent) basis, and a request for a build for the application is made with each significant source code change and/or submission.

A build is executable code, which is successfully created and tested, for an application. A set of operations for providing a build can include a compiling phase for compiling source code of an application to produce artifacts, a unit testing phase for testing functionality of the artifacts, and an integration testing phase for testing the artifacts on the virtual resources of a distributed system. Artifacts can refer to the executable code that can be run on a computer for executing the application. In a distributed system, the artifacts for the application can be run across multiple computing resources, such as virtual resources (e.g., virtual machines, container, etc.) and computing machines. A container can refer to an isolated set of resources allocated to executing an application and/or process independent from other applications and/or processes. A virtual machine can be a virtualization of a machine (computer) that includes its own operating system (referred to as a guest operating system) and executes application programs.

A build server can provide a notification indicating whether execution of the set of operations (i.e., compiling, unit testing, integration testing) for providing the build was a success or a failure. The build server can provide a notification of a failed build attempt when there is at least one failure that occurs during execution of the set of operations. The failure may occur in the compiling phase, unit testing phase, and/or integration testing phase. Some failures may be false failures. A false failure is a failure that is due to a computing environment issue, and is unrelated to the source code of the application (i.e., there is no actual issue with the source code itself). Users (e.g., computer program developers) are generally interested when build attempts fail due to underlying issues with a meaningful change in the proposed source code, so the users may debug the source code and take corrective action. Computer program developers may be unaware of the underlying infrastructure issue (e.g., slow central processing unit (CPU), insufficient memory, network bandwidth issue, etc.) that causes the failure during the execution of the set of operations and may unnecessarily debug source code, which can lead to delays in the computer program development process. Open source computer program development projects may involve hundreds of build requests a day, which may result in a large percentage of build attempts that are false failures. Traditionally, there is generally an insufficient amount of time and resources available for determining whether a failure is due to an underlying issue with the programming of the source code or with infrastructure issues.

Implementations of the present disclosure remove delays from the build process by forcing errors to occur in computing environments that are used for providing builds, creating a classifier model based on the forced errors to detect false failures, continuously monitoring the executions of operations for providing computer program builds to predict, using the classifier model, which executions may have false failures, and automatically (without user interaction) re-executing such operations in one or more modified computing environments to increase the likelihood of successfully (without failures) providing the requested builds. The technology discussed herein may be advantageous because it differentiates failures due to the computing environment (false failures) from failures due to the source code, filters out false failures from reports, and only provides notifications of failures that are related to the programming of the source code. The technology discussed herein may be further advantageous because the automatic (i.e., without user interaction) and continuous (i.e., without delay) detection of false failures frees up debugging computing resources for debugging issues with the source code.

FIG. 1 is an example system architecture 100 in which implementations of the present disclosure can be implemented. The system architecture 100 can provide build management services for automatically detecting false failures in executions of the set of operations for providing builds for a distributed system, and automatically re-executing the sets of operations. The system architecture 100 can include a build server 101 for running the sets of operations for providing builds in a continuous integration environment. The builds can be for source code 113 of an application that is being developed for a distributed environment. An application can be any type of application including, for example, a web application, a desktop application, a browser application, etc. An application can be a messaging application, a video application, a social networking application, video sharing application, photo sharing application, chat application, mobile application of a content provider or any combination of such applications. An application can be a computationally large or data-intensive application, such as a forecasting application, a modeling application, a data analysis application, etc. An application can be a real-time application. The term "real-time" indicates that a transmission of a user communication from sender to receiver and/or receipt of the user communication by the receiver is made within a specified time constraint (e.g., under 50 microseconds). The build server 101 can be hosted on a computing device such as a server computer, a desktop computer, a portable computing device such as, and not limited to, netbooks, laptop computers, and the like.

Users, such as computer program developer team members, can submit source code 113 to the build server 101 from clients 111 via network 105 to merge the submitted source code 113 with a shared mainline code base that is being stored and maintained by the build server 101. Users can submit source code 113 to the build server 101 on a daily (or more frequent) basis, and request a build for the submission. A build tool 110 can execute a set of operations to provide the build of the mainline code base. The set of operations include immediately testing isolated code when the code is added to the larger mainline code base.

A client machine 111 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 can be a private network (e.g., a local area network (LAN), a wide area network (WAN), intranet, or other similar private networks) or a public network (e.g., the Internet).

The build tool 110 can include a compiler 115 to compile computer source code 113 into binary code, and to generate build artifacts from the compiling and linking of the source code 113. An artifact is source code 113 that is compiled for testing as executable code. The build tool 110 can include a unit tester 117 and an integration tester 119 for running automated tests on the artifacts. The unit tester 117 can test that the individual functions in the code work properly. The integration tester 119 can test the artifacts in a distributed system environment.

The integration tester 119 can create a virtual resource cluster 107 for the integration testing of the artifacts. The virtual resource cluster 107 can be based on a container model and/or a virtual machine (VM) model. The virtual resources in the cluster 107 can be containers, virtual machines, container(s) within a virtual machine, and/or virtual machine(s) within a container. A container can refer to an isolated set of resources allocated to executing an application and/or process independent from other applications and/or processes. A virtual machine can be a virtualization of a machine (computer) that includes its own operating system (referred to as a guest operating system) and executes application programs. A host machine can host one or more virtual resources for virtualizing one or more application servers for executing the artifacts for the application for the integration testing.

In one example, the host machine for the cluster 107 may be the same computing machine that hosts the build server 101. In another example, there are one or more host machines for the cluster 107 that are computing machine(s) other than the computing machine that hosts the build server 101. In another example, there are multiple host machines for the cluster 107 that include the computing machine that hosts the build server 101 and one or more computing machines other than the computing machine that hosts the build server 101. The computing machines can be server computer systems, desktop computers or any other computing devices.

A host machine can allocate a certain amount of its resources to individual virtual resources (e.g., virtual machine, container), and can multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor can emulate the underlying hardware (e.g., infrastructure) of the host machine, making use of the virtual machine.

The application in the container can run under the host operating system. The host machine for the container can include a container engine to create and manage the containers. In one implementation, a container can run on a virtual machine to provide an extra layer of separation between applications running on a guest operating system of the virtual machine. In one implementation a virtual machine can run on a container to maintain isolation and security properties of virtual machines while being able to package and distribute computer programs as a container.

The integration tester 119 can run the artifacts in the cluster 107, and run integration tests against the distributed system being provided by the cluster 107. After the build tool 110 compiles the source code 113 and runs unit tests and integration tests, the build tool 110 can report whether the attempt to provide the build was a success or includes a failure. A failure can be caused by the compiling of the source code failing, unit testing failing, and/or integration testing failing.

The failures that are actually attributed to infrastructure issues are referred to herein as false failures in the context that the failures are not due to programming errors in the source code 113. The false failures may be caused by instabilities in the underlying commodity hardware infrastructure that is used for the compiling and testing. The commodity hardware may have limited networking bandwidth, limited memory, limited central processing unit (CPU) resources, and/or limited disk resources. For example, the integration testing may be conducted using a cluster 107 of four virtual machines as a distributed system (e.g., cloud computing system). The use of commodity hardware in the cluster 107 can make the distributed system have stochastic infrastructure issues. For example, false failures may be caused by a lack of disk space, a power outage, insufficient memory, overloaded networks, etc. in the cluster 107.

The system architecture 100 can include a build agent 109 to continuously monitor the executions of the set of operations for providing builds and automatically determine which executions have a false failure. The build agent 109 can be hosted on a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. In one example, the build agent 109 may be hosted on the same computing machine that hosts the build server 101.

The build agent 109 can intentionally cause the executions of the set of operations for providing builds to have a false failure (by forcing errors imitating infrastructure issues rather than programming errors in the source code) and can record the characteristics of the executions of the set of operations to create a corpus of classification data in a storage device 103, as described in greater detail below in conjunction with FIG. 2. The build agent 109 can also store the characteristics of the executions of the set of operations that successfully provide builds as part of the classification data in the storage device 103. The build agent 109 can be coupled to one or more storage devices (e.g., storage device 103) via a network 105. The storage device 103 can be any computing hardware that is used for storing, porting and extracting data files and objects. The storage device 103 can store information both temporarily and permanently, and can be internal or external to a computer, server or any similar computing device.

The build agent 109 can subsequently use the corpus of classification data to automatically detect which executions of the set of operations that have failures are executions that have a high (e.g., as defined by a threshold) probability of being false failures, can filter out the executions of the set of operations that are classified as having a false failure, and notify users (e.g., computer program developers) of the build attempts that have failure results that are not false.

The commodity hardware infrastructure used for the providing the builds may be unstable. At the time of the executions of the set of operations for providing the builds, the commodity hardware may be strained, and the build agent 109 can automatically trigger re-execution for the sets of operations for executions that are classified as having a false failure to monitor such re-executions for successful results. During the re-executions, a component (e.g., network, disk, memory, power, CPU) in the computing environment of the commodity hardware infrastructure may change to become stable such that the outcomes of the re-executions may include successful results. For example, network bandwidth may increase during a re-execution. The build agent 109 can automatically trigger multiple re-executions for providing a particular build and inject delays between each re-execution. The injected delays can allow the computing environment to change and the commodity hardware to become stable. In one implementation, the build agent 109 may cause a change in the computing environment, which is used for providing the build, to remove one or more commodity hardware infrastructure issues. For example, prior to re-executing the set of operations, the build agent 109 may determine that a virtual machine is powered down, and may send a request to bring the virtual machine back up or instantiate a new virtual machine during the delay. The build agent 109 can classify the re-execution of the set of operations that provide builds without failures as successful.

Figure 2:
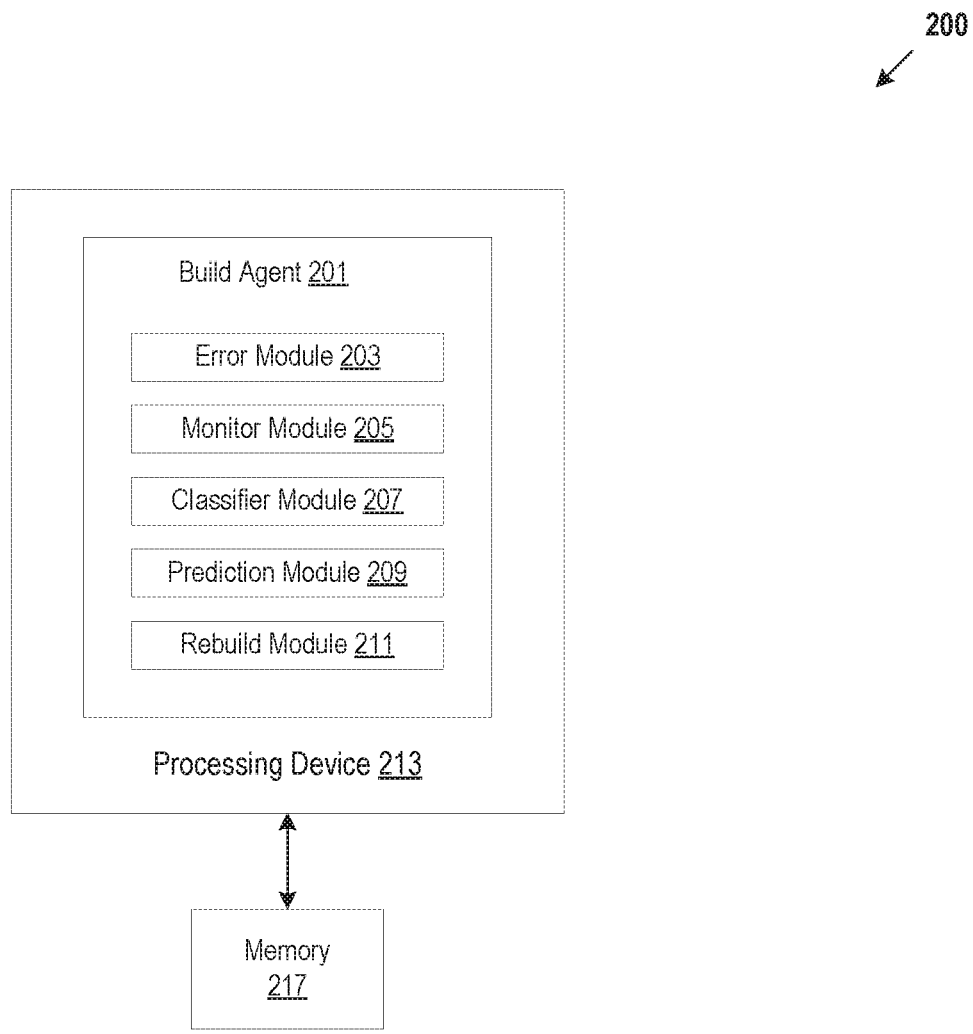
FIG. 2 depicts a high-level component diagram of one illustrative example of a build management system, in which systems and methods described herein may operate.

FIG. 2 depicts a high-level component diagram of one illustrative example of a build management system 200, in which systems and methods described herein may operate. The build management system 200 can include a processing device 213, and memory 217. The processing device 213 can be coupled to memory 217 including instructions to execute a build agent 201, an error module 203, a monitor module 205, a classifier module 207, a prediction module 209, and a rebuild module 211. The processing device 213 can include instructions to execute the error module 203, the monitor module 205, the classifier module 207, the prediction module 209, and the rebuild module 211 of the build agent 201. The processing device 213 can reside on a computing device such as a server computer, a desktop computer, and the like.

The build agent 201 can automatically detect when a failure is caused by some extrinsic failure, such as a failure (e.g., network failure, CPU failure, etc.) in the infrastructure used to perform a set of operations for providing a build, rather than caused by an error in the source code of an application. The build agent 201 can classify the execution of the set of operations as having a false failure, and can automatically re-run the set of operations for providing the build to determine if the re-execution of the set of operations for providing the build can be successful or contains a failure again. The set of operations can include compiling the source code of an application to produce artifacts for the application, performing unit testing on the artifacts, and performing integration testing on the artifacts.

Responsive to a request for a build for an application, the error module 203 can force an error to occur during an execution of each of the requests. The execution of each request can represent an execution of a set of operations for providing a respective build. The error module 203 can randomly select executions of the set of operations being performed by a build server, and force the error to occur in the randomly selected executions. The error module 203 can automatically trigger executions of the set of operations, and cause the error to occur in the triggered executions. The error module 203 can automatically trigger the executions according to a frequency and/or schedule that is specified in configuration data that is stored in memory 217. The configuration data can be configurable and/or user (e.g., system administrator) defined. The error module 203 can induce network errors, disk errors, memory errors, power errors, virtualization errors, and/or CPU errors. For example, the error module 203 can create virtual memory problems to induce out of memory errors, can cause disks to become full and/or network partitions to become full to generate network connectivity errors and/or SSH (Secure Socket Shell) errors, and can overload CPU(s) and/or kill computing machines to fore timeout errors. The error module 203 can send messages to components of the infrastructure used to execute the set of operations for providing a build to induce the error(s), as described in greater detail below in conjunction with FIG. 3.

The monitor module 205 can monitor a build server for executions being performed by the build server. The monitor module 205 can access data, which indicates whether an execution has successfully provided a build or whether the execution has failed, in a data store and can determine which executions have a failure. The data, which indicates whether an execution is successful or includes a failure, can be produced by the build server.

The classifier module 207 can determine that an execution of a set of operations for providing a build has a false failure caused by a forced error. The classifier module 207 can classify the executions of the sets of operations that have failures, for example, that are detected by the monitor module 203, as having false failures, as described in greater detail below in conjunction with FIG. 3. The classifier module 207 can create a feature vector for each execution of the set of operations that has a forced error and can associate the feature vector for the respective execution with a false failure label. The feature vectors can be stored in memory 217 as sample feature vectors of executions having a false failure.

The prediction module 209 can automatically determine that one or more features pertaining to an execution of a new set of operations for providing a new build correspond to one or more features pertaining to an execution of one of the sets of operations that are classified as having a false failure, as described in greater detail below in conjunction with FIG. 3.

The rebuild module 211 can automatically re-execute a set of operations for providing the new build in one or more modified computing environments to increase a likelihood for successfully providing the new build, as described in greater detail below in conjunction with FIG. 3. The rebuild module 211 can determine whether a specified period of time has elapsed from the execution of the set of operations that is likely to have a false failure, and automatically trigger one or more additional executions of the set of operations in modified computing environments, as described in greater detail below in conjunction with FIG. 4. For example, the rebuild module 211 can wait 2 minutes before triggering a first additional execution, then wait 4 minutes before triggering a second additional execution, then wait 8 minutes before triggering a third additional execution, and then wait 16 minutes before triggering a fourth additional execution. The delays can help stabilize the computing environment and decrease the likelihood of a respective execution of the set of operations as having a false failure. The rebuild module 211 can provide an indicator for the additional executions indicating whether any of the additional executions successfully provide a build, as described in greater detail below in conjunction with FIG. 4.

Figure 3:
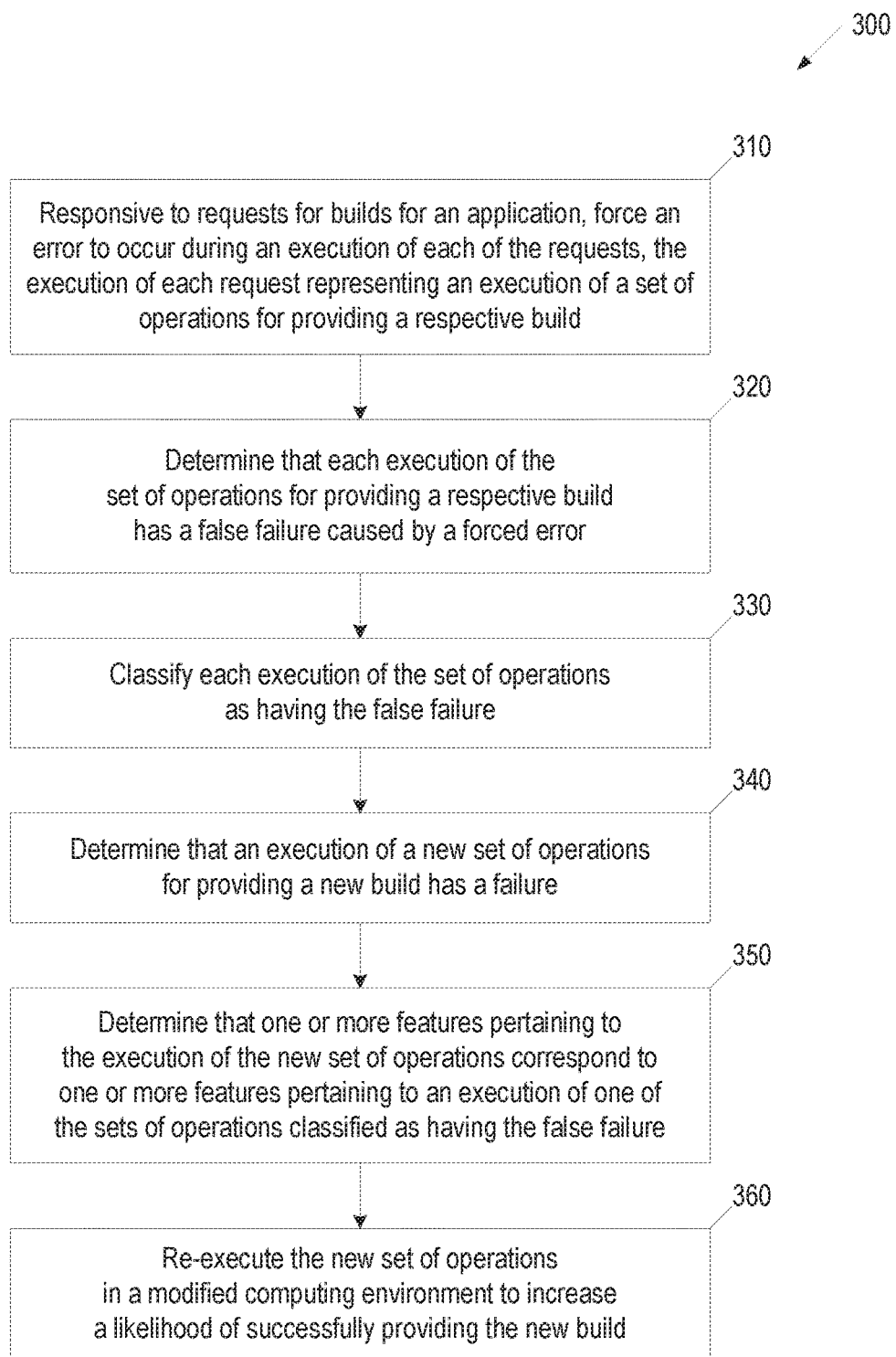
FIG. 3 is a flow diagram for a method for managing build failures in continuous integration environments for distributed systems, in accordance with one or more implementations of the present disclosure.

FIG. 3 is a flow diagram for a method 300 for managing build failures in continuous integration environments for distributed systems, in accordance with one or more implementations of the present disclosure. Method 300 can be performed by processing logic that can comprise hardware (e.g., circuitry, dedicated logic, programmable logic, microcode, etc.), computer programs (e.g., instructions run on a processing device), or a combination thereof. In one implementation, method 300 is performed by a build agent (e.g., build agent 109 of FIG. 1, build agent 201 of FIG. 2) executed by a processing device in a computing machine. At least a portion of method 300 can be performed automatically by the computing machine without user interaction.

At block 310, responsive to requests for builds for an application, the processing device forces an error to occur during an execution of each of the requests, where each request is executed by performing a set of operations. The set of operations can include compiling code to produce executable code for a respective build, unit testing the executable code of the respective build, and/or integration testing the executable code of the respective build. In one implementation, the processing device continually monitors executions of the set of operations that being performed by a build server, randomly selects executions, and forces the error to occur during the randomly selected executions. In another implementation, the processing device triggers executions of the set of operations, and forces the error to occur in the triggered executions. The processing device can force one or more errors to occur with each execution (e.g., randomly selected execution, triggered execution). The processing device can change one or more properties of the computing environments that are used for executing the set of operations to force the error to occur. The one or more properties can be a network property, a disk property, a memory property, a power property, a virtualization property, and/or a CPU unit property. The processing device can induce different errors in the executions.

The processing device can target any component of the infrastructure (e.g., virtual resources, build server) that the build server is using to run the executions, and cause the error(s) to occur in the targeted component(s). The processing device can send a request to one or more targeted components for one or more actions to occur, which can cause the error. For example, the processing device can send multiple data access requests to a virtual machine, which is being used for an execution of the set of operations for providing a respective build, to cause the virtual machine to have an insufficient memory issue, a disk capacity issue, a CPU overload issue, virtualization issues, and/or a network bandwidth issue.

A set of operations for providing a build can be run for various types of components of a distributed system (e.g., cloud computing platforms). The components can include, for example, the commodity hardware, the virtualization applications, the cloud platform servers, etc. For example, there are various hypervisors that can be installed on host machines to create virtual environments for virtual machine and/or containers that are used in the execution of the set of operations. The hypervisors can virtualize operating systems on hardware, network and storage of a data center. In another example, there are various cloud infrastructure platforms, which include ready made infrastructure (e.g., hardware, network and storage), and may require credentials for access to the cloud infrastructure platforms.

The processing device can query the build server to determine which component(s) are to be used for the execution of the set of operation for providing a build and to receive environment information for the execution. The processing device can also query the components for environment information. The environment information can include, for example, how many virtual resources (e.g., virtual machines and/or containers) are running for the execution of the set of operations, the Internet Protocol (IP) addresses for the virtual resources, the disks allocated to the virtual resources, the memory allocated to the virtual resources, CPU information pertaining to the virtual resources, operating systems for the virtual resources, etc.

For example, the processing device can contact the build server to query how many virtual machines and/or containers are running for the execution. For example, the processing device may determine, from the build server, that at least a portion of the set of operations is currently running or is scheduled to be run on Host-Machine-A having Hypervisor-A. The processing device can use the obtained environment information (e.g., number of virtual resources, IP addresses, disk information, memory information, CPU information, operating systems information, etc.) to force an error to occur in the computing environment that is used to execute the set of operations for providing the build. The processing device can force the error to occur during compiling, unit testing, and/or integration testing.

The processing device can customize the messages to cause the error(s) during the execution based on the components being used for the execution. For example, the processing device may receive the IP address of Host-Machine-A from the build server, and can use the IP address to send multiple data access requests to the virtual machine (s) on Host-Machine-A to force insufficient memory errors on Host-Machine-A. The processing device can conform the data access requests to the format for the Hypervisor-A, which is running on Host-Machine-A.

In another example, the processing device may determine from the build server that at least a portion of a set of operations is currently executing or is scheduled to be executed on a particular cloud infrastructure platform, such as Cloud-Platform-A. The processing device can obtain user credential data for Cloud-Platform-A from configuration data that is stored on a data store. The processing device can use the user credential data for the Cloud-Platform-A to send a message to a cloud management server of Cloud-Platform-A to be authenticated by the cloud provider system. Upon being authenticated, the processing device can send a message to the cloud management server to power off particular virtual resources (e.g., virtual machines and/or containers), which are used to execute the set of operations for providing the build, to cause errors in the execution of the set of operations.

At block 320, the processing device determines that each execution of the set of operations for providing a respective build has a false failure caused by a forced error. A build server can produce data indicating whether execution of the set of operations (i.e., compiling, unit testing, integration testing) for providing the build was a success or a failure, and can store the data in a data store. The processing device can access the data in the data store and can determine that the each execution, which was conducted with a forced error, has a failure. The processing device can determine that since there were forced errors during the executions, that the failures in these executions are false failures.

At block 330, the processing device classifies each execution of the set of operations as having the false failure. The processing device can classify each execution of the set of operations as having the false failure by creating a feature vector for each execution of the set of operations and can associate the feature vector for the respective execution with a false failure label. When a build server executes a set of operations for providing a respective build, the build server can produce output for each execution. Each output can be one or more logs of data describing events that occur during the execution of the set of operations for the respective build, such as events pertaining to compiling source code to produce artifacts for the build, unit testing of the artifacts for the build, and integration testing of the artifacts for the build. The one or more logs can be text files. The events can include timeouts, errors, test start times, test stop times, etc. The logs can include indicators of whether a test (e.g., unit test, integration test) has passed or failed, test identifiers, error identifiers, etc.

The processing device can extract feature data for the executions from the respective outputs and create a feature vector for each execution. Each feature vector can include, for example, the number of times that a particular word (e.g., "timeout," "error," "pass", "success", "fail," "failure," etc.) occurs, the number of times a certain sentence occurs, the number of times a specified pattern occurs, etc. The feature vectors can be stored in a data store as sample feature vectors of executions having a false failure. The processing device can assign a probability value (e.g., percentage value, decimal value) to each feature vector indicating a likelihood that an execution can have a false failure. The processing device can use the sample feature vectors to build a classifier model to assign probabilities to new executions to indicate the likelihood that a respective new execution of the set of operations can have a false failure.

Subsequently, the classifier model can be used to predict which failures of build operations were likely caused by computing infrastructure issues as opposed to programming errors in the source code. In particular, at block 340, the processing device determines that an execution of a new set of operations for providing a new build has a failure. The build server may receive a request for a new build, and the processing device can detect the request. For example, a user (e.g., computer program development) may submit new source code to the build server and may request a new build. The processing device can access the data, which may be generated by the build server during the execution, that indicates whether the execution of the new set of operations for providing the new build was a success or includes a failure. If the data indicates that the execution of the new set of operations for providing the new build includes a failure, then at block 350, processing device determines that one or more features pertaining to the execution of the new set of operations correspond to one or more features pertaining to an execution of one of the sets of operations that were previously classified as having the false failure. When the build server executes the new set of operations for providing the new build, the build server can produce output (e.g., one or more logs) including data that describes the events that occur during the execution of the new set of operations (e.g., compiling, unit testing, integrations testing). The processing device can receive the output for the execution and extract feature data from the output. The processing device can create a feature vector for the execution of the new set of operations and can input the feature vector into a classifier model to compare the feature vector for the execution of the new set of operations to the sample feature vectors for executions of the sets of operations that are classified as having a false failure. The processing device may determine that one or more features in the feature vector for the execution of the new set of operations match one or more features in one of the sample feature vectors for executions of the sets of operations that are classified as having a false failure.

At block 360, the processing device automatically re-executes the new set of operations in a modified computing environment to increase a likelihood of successfully providing the new build. The modified computing environment is described in greater detail below in conjunction with FIG. 4. The processing can determine to re-execute the new set of operations based on a probability threshold. The processing device can determine a probability for the execution of the new set of operations using the classifier model, as described in greater detail below in conjunction with FIG. 4. The probability indicates a likelihood of the execution of the new set of operations having a false failure. IF the processing device determines that the probability for the execution of the new set of operations satisfies a threshold specifying a minimum probability for classifying an execution of the new set of operations as having a false failure, the processing device can automatically re-execute the new set of operations, as described in greater detail below in conjunction with FIG. 4. The processing device can automatically re-execution the new set of operations multiple times, as described in greater detail below in conjunction with FIG. 4.

Figure 4:
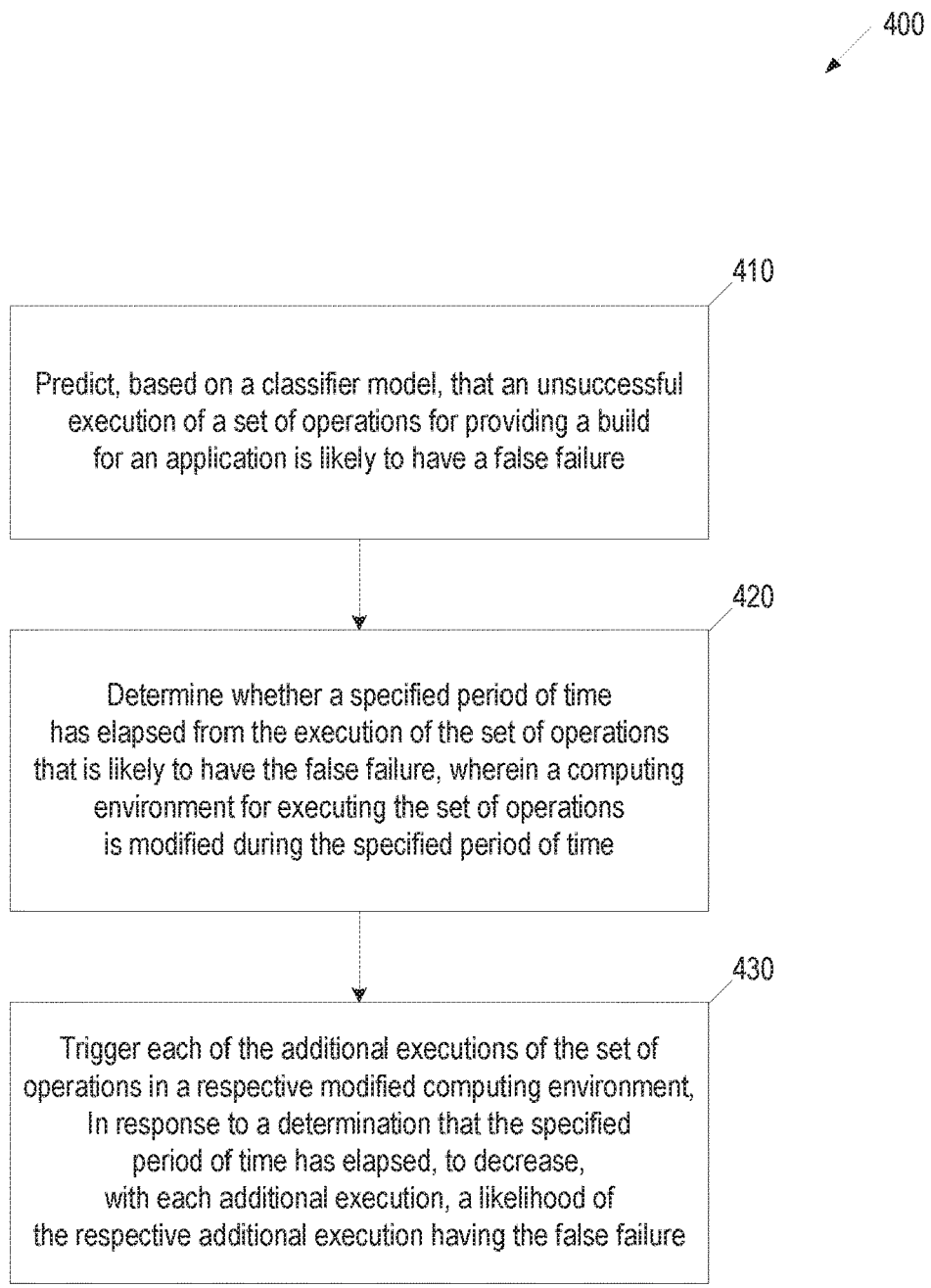
FIG. 4 is a flow diagram for a method for triggering, in modified computing environments, additional executions of operations that provide a build to reduce a likelihood of having a false failure during such operations, in accordance with one or more implementations of the present disclosure.

FIG. 4 is a flow diagram for a method 400 for triggering, in modified computing environments, additional executions of operations that provide a build to reduce a likelihood of having a false failure during such operations, in accordance with one or more implementations of the present disclosure. Method 400 can be performed by processing logic that can comprise hardware (e.g., circuitry, dedicated logic, programmable logic, microcode, etc.), computer programs (e.g., instructions run on a processing device), or a combination thereof. In one implementation, method 400 is performed by a build agent (e.g., build agent 109 of FIG. 1, build agent 201 of FIG. 2) executed by a processing device in a computing machine. At least a portion of method 400 can be performed automatically by the computing machine without user interaction.

At block 410, the processing device automatically predicts, based on a classifier model, that an unsuccessful execution of a set of operations for providing a build for an application is likely to have a false failure. The false failure can be related to an infrastructure issue, such as, a network issue in the computing environment used for the execution, a disk issue in the computing environment, a memory issue in the computing environment, a power issue in the computing environment, a virtualization issue in the computing environment, and/or a CPU issue in the computing environment. The processing device can access data, produced by a build server, for the execution from a data store to first determine that the execution has a failure. In another example, the processing device can query a build server to determine whether the execution has a failure, and may receive a response from the build server indicating that the execution has a failure.

The processing device may then determine that the failure is false by using feature vectors and a classifier model. The processing device can receive output (e.g., logs) pertaining to the execution, extract feature data from the logs, and create a feature vector for the execution. The processing device can determine which data to extract based on configuration data that is stored in a data store. The feature vector can include, for example, a count of a particular word (e.g., "timeout," "error," "pass," "success," "fail," "failure," etc.) occurrence, a count of a certain sentence occurrence, a count of a specified pattern occurrence, etc.

The processing device can input the feature vector into a classifier model and execute the classifier model to compare the feature vector to the sample feature vectors for a training set of prior executions of sets of operations that were classified as having a false failure. The classifier model can be a probabilistic classifier, which is a classifier that is able to predict, given an input (e.g., feature vector), a probability for the input based on the sample feature vectors. The processing device can use the classifier model to determine a probability of the execution having a failure that is a false failure, and can determine that the probability of the execution meets a threshold specifying a minimum probability for classifying an execution of the set of operations as having the false failure. The threshold can be stored in configuration data in a data store. The threshold can be configurable and/or user (e.g., system administrator) defined. For example, the processing device may input the feature vector for the execution into the classifier model, and may receive a result from the classifier model that the execution has a 62% probability of having a false failure. The threshold may be 60% and the processing device may determine that the probability of the build execution satisfies the threshold, and can predict that the execution of the set of operations is likely to have a false failure.

At block 420, the processing device can determine whether a specified period of time has elapsed from the execution of the set of operations that is likely to have the false failure. The period of time can be configurable and/or user (e.g., system administrator) defined. The period of time can be specified in configuration data that is stored in a data store. A computing environment for executing the set of operations can be modified during the specified period of time. The period of time can allow the computing environment to change to become stable. In one implementation, the processing device can cause a change in the computing environment, which is used for providing the build, to remove commodity hardware infrastructure issues. For example, the processing device may determine that a virtual machine is powered down, and may send a request to instantiate the virtual machine or instantiate a new virtual machine during the delay.

If the specified period of time has elapsed (block 420), the processing device automatically triggers additional executions of the set of operations in the modified computing environment at block 430. The processing device can send a message to a build server to perform another execution. The processing device can include a source code identifier in the message to specify which source code to use for performing the execution. The triggering of each of the additional executions can decrease, with each additional execution, a likelihood of the respective additional execution having the false failure.

The number of additional executions to execute can be specified in configuration data. For example, the configuration data may specify that the processing device should trigger four additional executions of the set of operations. The number of executions can be configurable and/or user (e.g., system administrator) specified.

The processing device can track the number of executions that have been triggered by storing a count value in a data store and compare the count value to the number specified in the configuration data. In one implementation, the processing device determines whether other periods of time have elapsed between triggering an additional execution. The other periods of time can exponentially increase with each trigger of an additional execution. For example, the configuration data may specify that when the processing device predicts that an execution of a set of operations for providing a build is likely to have a false failure, the processing device should wait 2 minutes from the execution or completion of the set of operations before triggering a first additional execution, then wait 4 minutes from the execution or completion of the first additional execution before triggering a second additional execution, then wait 8 minutes from the execution or completion of the second additional execution before triggering a third additional build execution, and then wait 16 minutes from the execution or completion of the third additional execution before triggering a fourth additional build execution. In another implementation, the periods of time are the same.

In one implementation, the processing device provides an indicator for the additional executions of whether any of the additional executions successfully provide the build. In one example, the processing device creates an indicator if there is at least one of the additional executions that successfully provides the build. The indicator can be a message indicating that compiling, unit testing, and integration testing was successful. The processing device can send the message to the build server and/or to a user (e.g., computer program developer, system administrator). In another example, the processing device can add a build identifier for the execution of the set of operations to a list of successful builds as the indicator.

In one implementation, if there is no successful build that is provided from the additional executions, the processing device provides a notification to a user (e.g., system administrator) indicating that there was no successful build provided from the additional executions. In one implementation, if the additional executions do not successfully provide a build, the processing device automatically adjusts the probability threshold, which specifies the minimum probability for classifying an execution of the set of operations as having the false failure. For example, the processing device may increase the threshold. For example, the processing device may increase the threshold from 60% to 65%. The processing device can continually improve the classifier model by updating the sample feature vectors and modifying the probability threshold.

Figure 5:
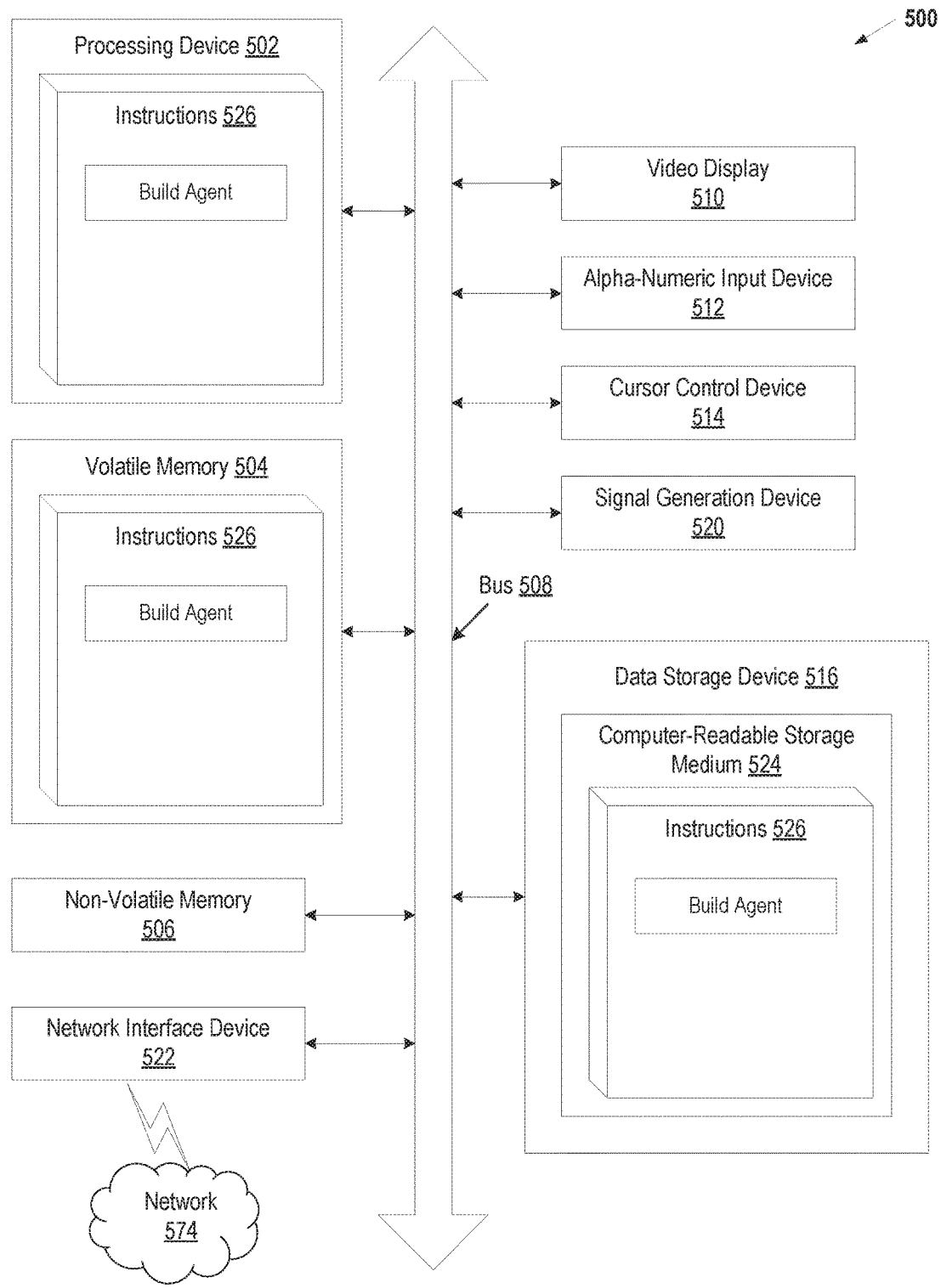
FIG. 5 is a block diagram of an example computer system that may perform one or more of the operations described herein.

FIG. 5 depicts a block diagram of a computer system 500 operating in accordance with one or more aspects of the present disclosure. In various illustrative examples, computer system 500 may correspond to a computing device within system architecture 100 or build management system 200 of FIG. 1 and FIG. 2 respectively. The computer system 500 may be included within a data center that supports virtualization. Virtualization within a data center results in a physical system being virtualized using virtual machines and/or containers to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. A container may be an isolated set of resources allocated to executing an application and/or process independent from other applications and/or processes. This type of virtualization results in multiple VMs and/or containers sharing physical resources.

In certain implementations, computer system 500 may be connected (e.g., via a network 574, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including build agent 109 of FIG. 1 and build agent 201 of FIG. 2 for implementing methods 300 or 400.

Instructions 526 may also reside, completely or partially, within volatile memory 504 and/or within processing device 502 during execution thereof by computer system 500, hence, volatile memory 504 and processing device 502 may also constitute computer-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "forcing," "determining," "classifying," "re-executing," "changing," "building," "predicting," "triggering," "creating," "executing," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and method 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   responsive to a plurality of requests for a plurality of builds for an application, forcing, by a build agent executing by a processing device, an error to occur during an execution of each of the plurality of requests, wherein the execution of each request represents an execution of a set of operations for providing a respective build of the plurality of builds;
   determining, by the processing device, that each execution of the set of operations for providing the respective build has a false failure caused by a forced error;
   classifying, by the processing device, each execution of the set of operations as having the false failure;
   building a classifier model using feature vectors representing features pertaining to executions of the sets of operations classified as having the false failure;
   determining that an execution of a new set of operations for providing a new build has a failure;
   determining, using the classifier model, that one or more features pertaining to the execution of the new set of operations correspond to one or more of the features pertaining to an execution of one of the sets of operations classified as having the false failure; and
   re-executing, by the processing device, the new set of operations in a modified computing environment to increase a likelihood of successfully providing the new build.

2. The method of claim 1, wherein the plurality of requests for the plurality of builds are randomly selected from a set of requests submitted to a build server.

3. The method of claim 1, wherein forcing the error to occur comprises:
   changing one or more properties of a computing environment for each execution of the set of operations.

4. The method of claim 3, wherein the one or more properties comprise at least one of a network property, a disk property, a memory property, a power property, a virtualization property, or a central processing unit property.

5. The method of claim 1, wherein building the classifier model further comprises:
   assigning a probability value to each of the sample feature vectors indicating a likelihood that an execution comprises the false failure, wherein the classifier model is for assigning a probability to the execution of the new set of operations of having the false failure.

6. The method of claim 1, wherein the one or more features comprise at least one of timeouts, test identifiers, or error identifiers.

7. The method of claim 1, wherein the set of operations comprises compiling code to produce executable code for a respective build, unit testing the executable code of the respective build, or integration testing the executable code of the respective build.

8. A system comprising:
   a memory; and
   a processing device coupled to the memory, the processing device to:
     responsive to a plurality of requests for a plurality of builds for an application, force an error to occur during an execution of each of the plurality of requests, wherein the execution of each request represents an execution of a set of operations for providing a respective build of the plurality of builds;
     determine that each execution of the set of operations for providing the respective build has a false failure caused by a forced error;
     classify each execution of the set of operations as having the false failure;
     build a classifier model using feature vectors representing features pertaining to executions of the sets of operations classified as having the false failure;

determine that an execution of a new set of operations for providing a new build has a failure;

determine, using the classifier model, that one or more features pertaining to the execution of the new set of operations correspond to one or more features pertaining to an execution of one of the sets of operations classified as having the false failure; and re-execute the new set of operations in a modified computing environment to increase a likelihood of successfully providing the new build.

9. The system of claim 8, wherein the plurality of requests for the plurality of builds are randomly selected from a set of requests submitted to a build server.

10. The system of claim 8, wherein to force the error to occur, the processing device is to:

change one or more properties of a computing environment for each execution of the set of operations.

11. The system of claim 10, wherein the one or more properties comprise at least one of a network property, a disk property, a memory property, a power property, a virtualization property, or a central processing unit property.

12. The system of claim 8, wherein, to build the classifier model, the processing device is further to:

assign a probability value to each of the sample feature vectors indicating a likelihood that an execution comprises the false failure, wherein the classifier model is for assigning a probability to the execution of the new set of operations of having the false failure.

13. The system of claim 8, wherein the one or more features comprise at least one of timeouts, test identifiers, or error identifiers.

14. The system of claim 8, wherein the set of operations comprises compiling code to produce executable code for a respective build, unit testing the executable code of the respective build, or integration testing the executable code of the respective build.

15. A non-transitory machine-readable storage medium including instructions that, when accessed by a processing device, cause the processing device to:

responsive to a plurality of requests for a plurality of builds for an application, force an error to occur during an execution of each of the plurality of requests, wherein the execution of each request represents an execution of a set of operations for providing a respective build of the plurality of builds;

determine that each execution of the set of operations for providing the respective build has a false failure caused by a forced error;

classify each execution of the set of operations as having the false failure;

build a classifier model using feature vectors representing features pertaining to executions of the sets of operations classified as having the false failure;

determine that an execution of a new set of operations for providing a new build has a failure;

determine, using the classifier model, that one or more features pertaining to the execution of the new set of operations correspond to one or more features pertaining to an execution of one of the sets of operations classified as having the false failure; and re-execute the new set of operations in a modified computing environment to increase a likelihood of successfully providing the new build.

16. The non-transitory machine-readable storage medium of claim 15, wherein the plurality of requests for the plurality of builds are randomly selected from a set of requests submitted to a build server.

17. The non-transitory machine-readable storage medium of claim 15, wherein to force the error to occur, the processing device is to:

change one or more properties of a computing environment for each execution of the set of operations.

18. The non-transitory machine-readable storage medium of claim 17, wherein the one or more properties comprise at least one of a network property, a disk property, a memory property, a power property, a virtualization property, or a central processing unit property.

19. The non-transitory machine-readable storage medium of claim 15, wherein, to build the classifier model, the processing device is further to:

assign a probability value to each of the sample feature vectors indicating a likelihood that an execution comprises the false failure, wherein the classifier model is for assigning a probability to the execution of the new set of operations of having the false failure.

20. The non-transitory machine-readable storage medium of claim 15, wherein the one or more features comprise at least one of timeouts, test identifiers, or error identifiers.

* * * * *